(12) United States Patent
Vetse (10) Patent No.: US 9,700,824 B2
(45) Date of Patent: Jul. 11, 2017

(54) FILTER SHAKER SYSTEM AND METHOD

(75) Inventor: Kurt Morris Vetse, Maple Grove, MN (US)

(73) Assignee: Nilfisk, Inc., Plymouth, MN (US)

( * ) Notice: Subject to any disclaimer, the term of this patent is extended or adjusted under 35 U.S.C. 154(b) by 0 days.

(21) Appl. No.: 14/112,699

(22) PCT Filed: Apr. 20, 2012

(86) PCT No.: PCT/US2012/034388
§ 371 (c)(1),
(2), (4) Date: Jan. 2, 2014

(87) PCT Pub. No.: WO2012/145587
PCT Pub. Date: Oct. 26, 2012

(65) Prior Publication Data
US 2014/0102053 A1    Apr. 17, 2014

Related U.S. Application Data

(60) Provisional application No. 61/477,364, filed on Apr. 20, 2011.

(51) Int. Cl.
*B01D 46/00* (2006.01)
*B01D 46/52* (2006.01)

(52) U.S. Cl.
CPC ....... *B01D 46/0075* (2013.01); *B01D 46/525* (2013.01); *B01D 2279/55* (2013.01)

(58) Field of Classification Search
CPC .. B01D 46/0075; B01D 46/00; B01D 46/525; B01D 2279/55

USPC .................................................... 55/282–305
See application file for complete search history.

(56) References Cited

U.S. PATENT DOCUMENTS

| 3,606,357 | A | * | 9/1971 | Yonkers ........................ 411/537 |
| 4,328,014 | A | | 5/1982 | Burgoon et al. |
| 4,345,353 | A | * | 8/1982 | Sommerfeld .................... 15/349 |
| 4,426,097 | A | * | 1/1984 | Livingston ........... B62D 63/067 |
| | | | | 280/416.1 |
| 4,787,923 | A | * | 11/1988 | Fleigle et al. .................. 55/304 |
| 5,194,077 | A | * | 3/1993 | Bargiel ................ E01H 1/0854 |
| | | | | 15/352 |

(Continued)

FOREIGN PATENT DOCUMENTS

EP    0860554 A2    8/1998
EP    2119389 A2    11/2009

(Continued)

OTHER PUBLICATIONS

"International Application Serial No. PCT/US2012/034388, International Search Report mailed Jul. 24, 2012", 5 pgs.

(Continued)

*Primary Examiner* — T. Bennett McKenzie
(74) *Attorney, Agent, or Firm* — Schwegman, Lundberg & Woessner, P.A.

(57) ABSTRACT

An air filter cleaning system comprises a filter shaker plate having a top surface and a bottom surface, a motor mount extending from the top surface of the filter shaker plate, a motor mounted on the motor mount, a first filter clamp configured to be positioned adjacent to a first side of the filter shaker plate, and a second filter clamp configured to be positioned adjacent to a second side of the filter shaker plate.

18 Claims, 8 Drawing Sheets

(56) References Cited

U.S. PATENT DOCUMENTS

| | | | | |
|---|---|---|---|---|
| 5,647,093 A | * | 7/1997 | Engel | E01H 1/0854 |
| | | | | 15/349 |
| 2009/0282641 A1 | * | 11/2009 | Black | B01D 46/0005 |
| | | | | 15/352 |
| 2010/0095925 A1 | * | 4/2010 | Sotiriades | B60K 15/067 |
| | | | | 123/198 R |

FOREIGN PATENT DOCUMENTS

| | | |
|---|---|---|
| WO | WO-2009110916 A1 | 9/2009 |
| WO | WO-2012145587 A1 | 10/2012 |

OTHER PUBLICATIONS

"International Application Serial No. PCT/US2012/034388, Written Opinion mailed Jul. 24, 2012", 7 pgs.
European Application Serial No. 12719843.0, Office Action mailed Dec. 19, 2013, 2 pgs.
European Application Serial No. 12719843.0, Response filed Jun. 26, 2014 to Office Action mailed Dec. 19, 2013, 12 pgs.
International Application Serial No. PCT/US2012/034388, International Preliminary Report on Patentability mailed Oct. 31, 2013, 8 pgs.
"European Application Serial No. 12719843.0, Official Action mailed Oct. 13, 2016", 4 pgs.
"European Application Serial No. 12719843.0, Response filed Mar. 13, 2017 to Communication Pursuant to Article 94(3) EPC mailed Oct. 13, 2016", 9 pgs.

* cited by examiner

FILTER SHAKER SYSTEM AND METHOD

CLAIM OF PRIORITY

This application is a U.S. National Stage Application filed under 35 U.S.C. §371 of International Application Serial No. PCT/US2012/034388, filed Apr. 20, 2012, and published on Oct. 26, 2012 as WO 2012/145587 A1, which claims the benefit of priority of U.S. Provisional Application No. 61/477,364, filed Apr. 20, 2011, entitled "FILTER SHAKER SYSTEM AND METHOD," all of which applications and publication are herein incorporated by reference in their entireties.

BACKGROUND

The present patent application relates generally to a cleaning apparatus. More specifically, the present patent application relates to a mechanical air filter cleaning system and method that can be structured for use in a cleaning apparatus.

Industrial and commercial floors are cleaned on a regular basis for aesthetic and sanitary purposes. There are many types of industrial and commercial floors ranging from hard surfaces, such as concrete, terrazzo, wood, and the like, which can be found in factories, schools, hospitals, and the like, to softer surfaces, such as carpeted floors found in restaurants and offices. Different types of floor cleaning equipment, such as scrubbers and sweepers, have been developed to properly clean and maintain these different floor surfaces.

A typical scrubber is a walk-behind or drivable, self-propelled, wet process machine that applies a liquid cleaning solution from an onboard cleaning solution tank onto the floor through nozzles fixed to a forward portion of the scrubber. Rotating brushes forming part of the scrubber rearward of the nozzles agitate the solution to loosen dirt and grime adhering to the floor. The dirt and grime become suspended in the solution, which is collected by a vacuum squeegee fixed to a rearward portion of the scrubber and deposited into an onboard recovery tank.

Scrubbers can be very effective for cleaning hard surfaces. Unfortunately, debris on the floor can clog the vacuum squeegee, and thus, the floor should be swept prior to using the scrubber. Consequently, sweepers are commonly used to sweep a floor prior to using a scrubber. A typical sweeper is a self propelled, walk-behind or drivable dry process machine which picks debris off a hard or soft floor surface without the use of liquids. The typical sweeper has rotating brushes which sweep debris into a hopper or "catch bin." Combination scrubber-sweepers have been developed that provide the sweeping and scrubbing functionality in a single unit.

Sweeper systems typically utilize a filter assembly to filter the "dirty" air that is suctioned into the hopper. The filter in the filter assembly typically comprises a conventional pleated panel filter.

One method for cleaning traditional pleated panel filters involves using mechanical vibration. This can be accomplished by vibrating the filter frame and consequently the filter media, using a "comb" to move or flick the individual pleats, or mechanically vibrating the filter media through direct contact. The latter has a detrimental effect on the pleated filter media because vibration between the media and any contacting part will wear holes in the media, which allows for dirty air to pass therethrough.

PowerCore® air filters produced by the Donaldson Company are a compact style of air filter that was originally designed for engine air intake systems in automotive/vehicle applications. Unlike conventional pleated panel filters where a sheet of filter media is folded and the bends in the media are perpendicular to the flow of air, the PowerCore® filters contain a series of small flutes made from folded filter media that are closed on one end and are parallel to the flow of air. Dirty air enters one flute, passes through the wall of the flute and the clean air exits the other side of the filter through one of the adjacent flutes. These small flutes allow a larger amount of filter media to be packaged in the same amount of space occupied by a conventional panel filter. The advantage is that a smaller sized filter will contain the same amount of filtering area.

As of today, the only known means to clean fluted filters is with pulsed air. Particularly, the pulsed air system uses an air compressor to supply compressed air to a series of nozzles that are controlled by a solenoid valve. These nozzles are positioned over the clean side of the filter and the solenoid valve pulses short bursts of compressed air into the filter to push dust back out of the filter i.e., direction of the pulsed air flow is opposite the flow of air through the filter during normal operation).

OVERVIEW

This overview is intended to provide an overview of subject matter of the present patent application. It is not intended to provide an exclusive or exhaustive explanation of the invention. The detailed description is included to provide further information about the present patent application.

In an example, an air filter cleaning system can be provided that includes a filter shaker plate having a top surface and a bottom surface, a motor mount extending from the top surface of the filter shaker plate, a motor mounted on the motor mount, a first filter clamp configured to be positioned adjacent to a first side of the filter shaker plate, and a second filter clamp configured to be positioned adjacent to a second side of the filter shaker plate.

In an example, an air filter cleaning system can be provided that includes a filter shaker plate having a top surface and a bottom surface, a motor mount extending from the top surface of the filter shaker plate, a motor mounted on the motor mount, a first filter clamp configured to be positioned adjacent to a first side of the filter shaker plate, and a second filter clamp configured to be positioned adjacent to a second side of the filter shaker plate. The filter shaker plate can include a plurality of slots extending between the top surface and the bottom surface. The motor can include at least one eccentric configured to impart vibration to the filter shaker plate.

DETAILED DESCRIPTION

Generally speaking, the present patent application relates to a mechanical air filter cleaning system and method. More specifically, the present patent application provides an air filter cleaning system that can be incorporated into a cleaning apparatus, such as a sweeper or combination sweeper-scrubber, to conveniently and adequately clean an air filter. In part, the present patent application solves the problem of removing dust trapped in the flutes of an air filter through the use of mechanical vibration that can be in direct contact with the filter media and can be applied generally parallel to the filter media surface. The air filter cleaning system of the present patent application can be configured for use on any vacuum-type machine that utilizes an air filter. However, for purposes of example and not limitation, the air filter cleaning system of the present patent application will be described as applied to a combination sweeper-scrubber system.

Figure 1:
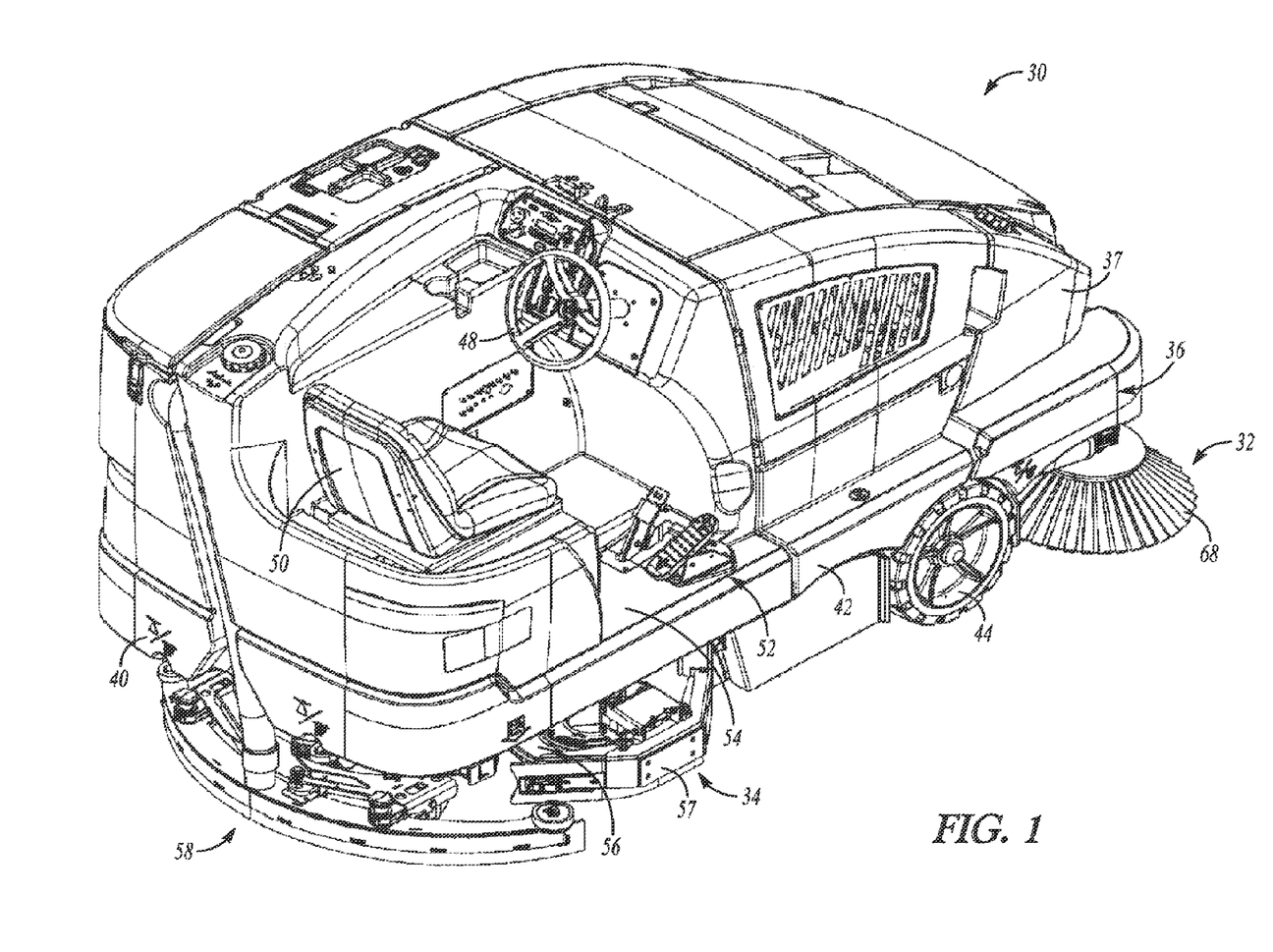
FIGS. 1 and 2 are top and bottom perspective views, respectively, of an example of a sweeper-scrubber that can utilize an air filter cleaning system in accordance with the present patent application.
Figure 2:
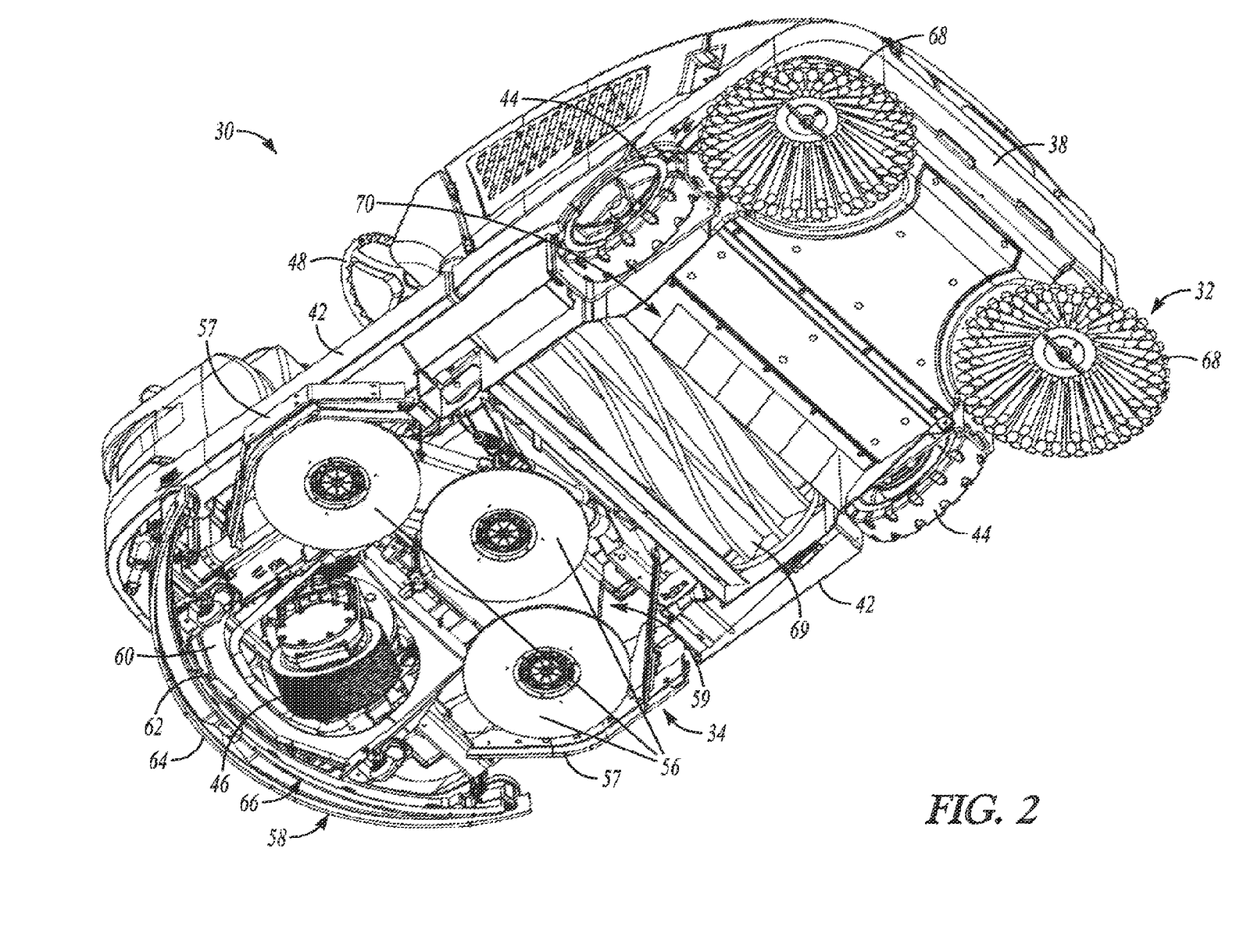

FIGS. 1 and 2 are top and bottom perspective views, respectively, of an example of a sweeper-scrubber 30 that can utilize an air filter cleaning system in accordance with the present patent application. As illustrated in FIGS. 1 and 2, the sweeper-scrubber 30 can include a sweeper system 32 for sweeping a floor surface and a scrubber system 34 for scrubbing the floor surface. Thus, as will be discussed in further detail below, the sweeper-scrubber 30 can be operable to sweep dirt and debris from the floor surface, apply a liquid cleaning solution from an onboard cleaning solution tank onto the floor being cleaned, and agitate the cleaning solution. Suction means can then be used to draw the cleaning solution into an onboard recovery tank.

Providing a floor cleaning system having both a sweeper system 32 and a scrubber system 34 can allow the operator to perform both "dry" and "wet" cleaning with the same system. These sweeping and scrubbing modes can be operated either separately or simultaneously depending upon the type of cleaning required.

As further illustrated in FIGS. 1 and 2, the sweeper-scrubber 30 can include a chassis 36 supporting a machine body 37 and having a forward end 38 and a rearward end 40 joined by sides 42. The chassis 36 can be supported by one or more floor engaging front wheels 44 and one or more rear steerable wheels 46. The one or more rear steerable wheels 46 can be operatively connected to a steering wheel 48 through the chassis 36. Alternatively, the chassis 36 can be supported by one or more front steerable wheels and one or more floor engaging rear wheels.

A driver seat 50 can be supported by the machine body 37 rearward of the steering wheel 48 for use by an operator of the sweeper-scrubber 30. The operator can sit on the driver seat 50 to operate the steering wheel 48 and foot operated control pedals 52, such as a brake and an accelerator, supported above a chassis top surface 54.

In operation, a nozzle can apply a liquid cleaning solution from an onboard cleaning solution tank onto the floor being cleaned. The cleaning solution can be gravity fed through the nozzle, or alternatively pumped out of the cleaning solution tank through the nozzle. The cleaning solution applied onto the floor can then be agitated by one or more ground engaging scrub brushes 56. In an example, the scrub brushes 56 together form a portion of a scrub deck assembly 59 of the scrubber system 34 adjacent to a bottom surface of the chassis 36. As illustrated in FIGS. 1 and 2, the outside scrub brushes 56 and associated skirts 57 can protrude from the side of the sweeper-scrubber 30 to improve scrubbing close to walls and other obstacles.

As illustrated in FIGS. 1 and 2, the ground engaging scrub brushes 56 can have substantially parallel axes of rotation that are generally perpendicular to the floor surface. The scrub brushes 56 can be rotatably driven by a suitable motor, and can be configured to agitate the cleaning solution sprayed onto the floor surface to dislodge dirt and grime adhered thereto. In addition to the scrub brushes 56, the scrubber system 34 can further include a floor engaging vacuum squeegee assembly 58 positioned proximal the chassis rearward end 40. The agitated cleaning solution and suspended dirt and grime can be drawn off the floor through the squeegee assembly 58 and into the recovery tank for disposal.

The squeegee assembly 58 can be coupled to a squeegee support bracket 60 pivotally fixed relative to the chassis 36, and can be moved between an operating position and a stored position (when not in use). The squeegee assembly 58, which can be operable to dry the floor being cleaned by the sweeper-scrubber 30, can include a forward arcuate squeegee blade 62 nested within a rearward arcuate squeegee blade 64. In an example, the nested squeegee blades 62 and 64 can extend substantially across the width of the sweeper-scrubber 30 and can define a crescent shaped vacuum zone 66. The squeegee blades 62 and 64 can be formed from any flexible material that can sealingly engage the floor, including elastomeric materials such as rubber, plastic, or the like.

The forward squeegee blade 62 can be configured to collect the cleaning solution on the floor, and can include notches in its floor engaging edge which allows the cleaning solution to enter the vacuum zone 66. The rearward squeegee blade 64 can include a continuous floor engaging edge in order to prevent the escape of the cleaning solution rearwardly from the vacuum zone 66.

As illustrated FIGS. 1 and 2, one or more side disk brooms 68 can be rotatably mounted proximal the chassis forward end 38 and forward of the ground engaging agitation brushes 56. The side disk brooms 68 can be driven by a suitable motor controlled by control circuitry. Each side broom 68 can be rotatable about a substantially vertical axis proximal one of the chassis sides 42, and can be configured to convey debris towards a centerline of the chassis 36 for pick-up by a main sweeper broom 69. In an example, the main sweeper broom 69 can be rotatable about a substantially horizontal axis. As illustrated in FIGS. 1 and 2, each side broom 68 can extend radially from its vertical axis past one side 42 of the chassis 36 in order to sweep the floor along a wall or other vertical or angled surface. Similar to the squeegee assembly 58, the side brooms 68 can be vertically movable between an operating position and a storage position.

Adjacent to the main sweeper broom 69, a debris collection chamber 70 located within the machine body 37 can be provided that is configured to collect the debris thrown generally forward by the main sweeper broom 69. In operation, the main sweeper broom 69 can sweep the debris forward into the debris collection chamber 70 for pick-up. Dust entrained air in the main sweeper brush compartment and the debris collection chamber 70 can then be filtered through an air filter cleaning system.

Figure 3:
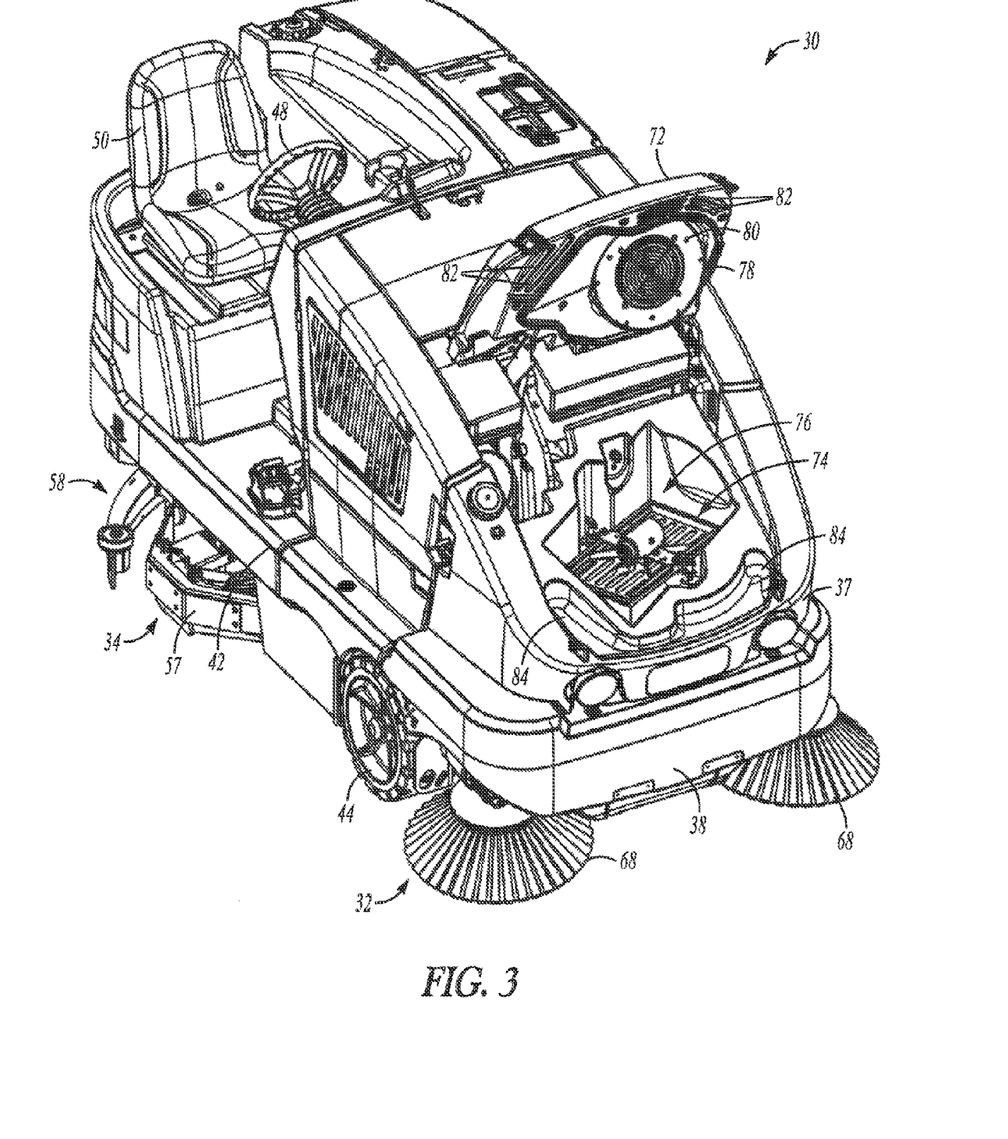
FIG. 3 is a front perspective view of the sweeper-scrubber with a front lift cover in an open position and providing access to an air filter cleaning system.

FIG. 3 is a front perspective view of the sweeper-scrubber 30 with a front lift cover 72 in an open position and providing access to an air filter cleaning system 74. As illustrated in FIG. 3, the air filter cleaning system 74 can be positioned within an air filter compartment 76. When the front lift cover 72 is lowered to a closed position, the air filter compartment 76 and the front lift cover 72 can define an enclosed chamber. A gasket 78 can be provided to form a seal between the air filter compartment 76 and the front lift cover 72 in the closed position.

As illustrated in FIG. 3, a vacuum fan 80 can be coupled to the front lift cover 72 and configured to draw air from the debris collection chamber 70 through the air filter cleaning system 74 when the front lift cover 72 is in the closed position. Particularly, the filtered air can be suctioned through the vacuum fan 80 and routed through internal passageways formed within the front lift cover 72. The front lift cover 72 can include one or more vents 82 that are configured to exhaust the filtered air out of the sweeper-scrubber 30. In an example, the sweeper-scrubber 30 can include one or more exhaust chambers 84 positioned adjacent to the forward end 38. When the front lift cover 72 is in the closed position, the one or more vents 82 can be positioned so as to deliver the filtered air into the one or more exhaust chambers 84. The filtered air can escape through one or more gaps formed between the front lift cover 72 and the machine body 37.

Figure 4:
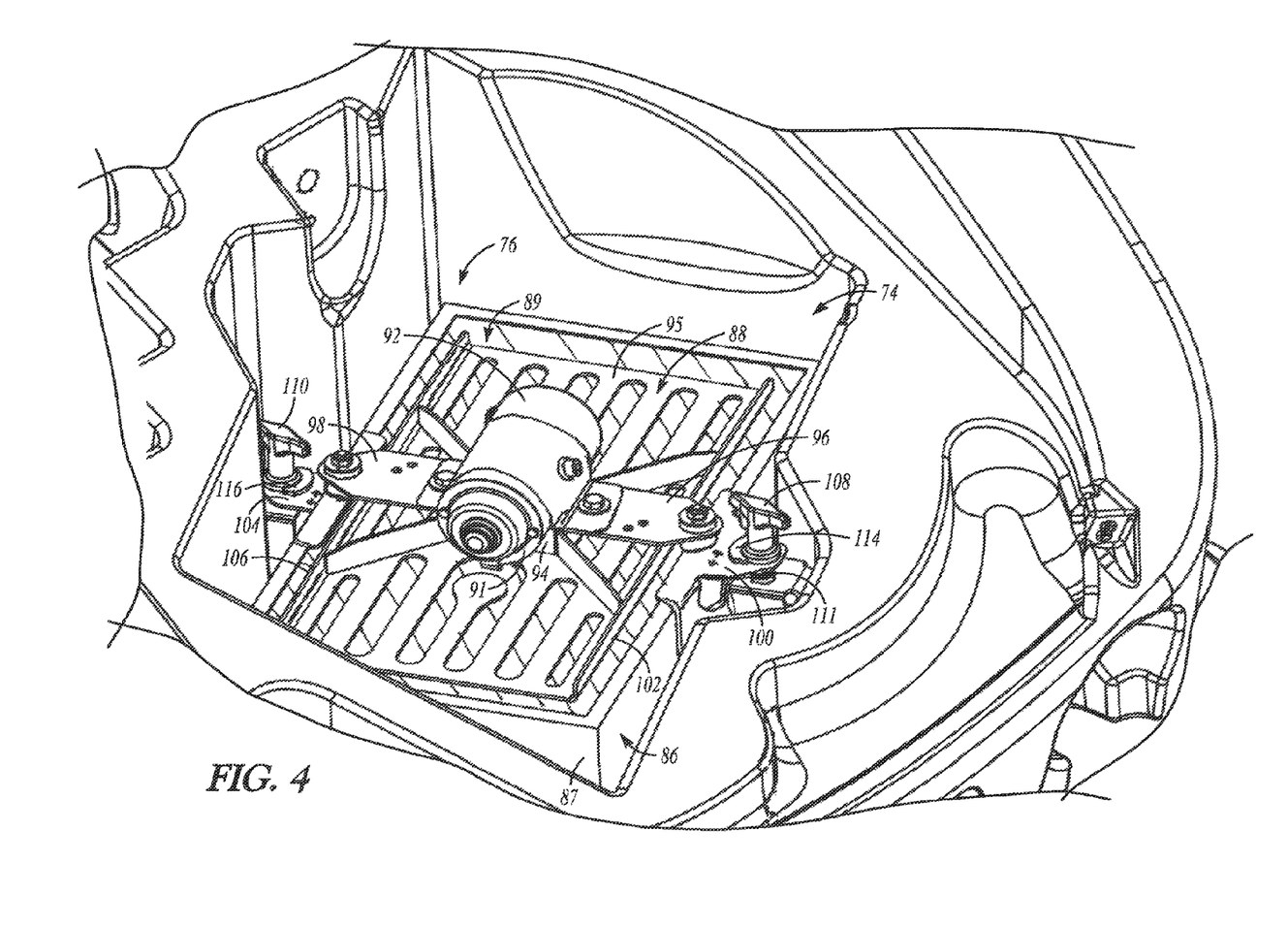
FIG. 4 is an enlarged perspective view of the air filter cleaning system positioned within an air filter compartment and coupled to an air filter.
Figure 5:
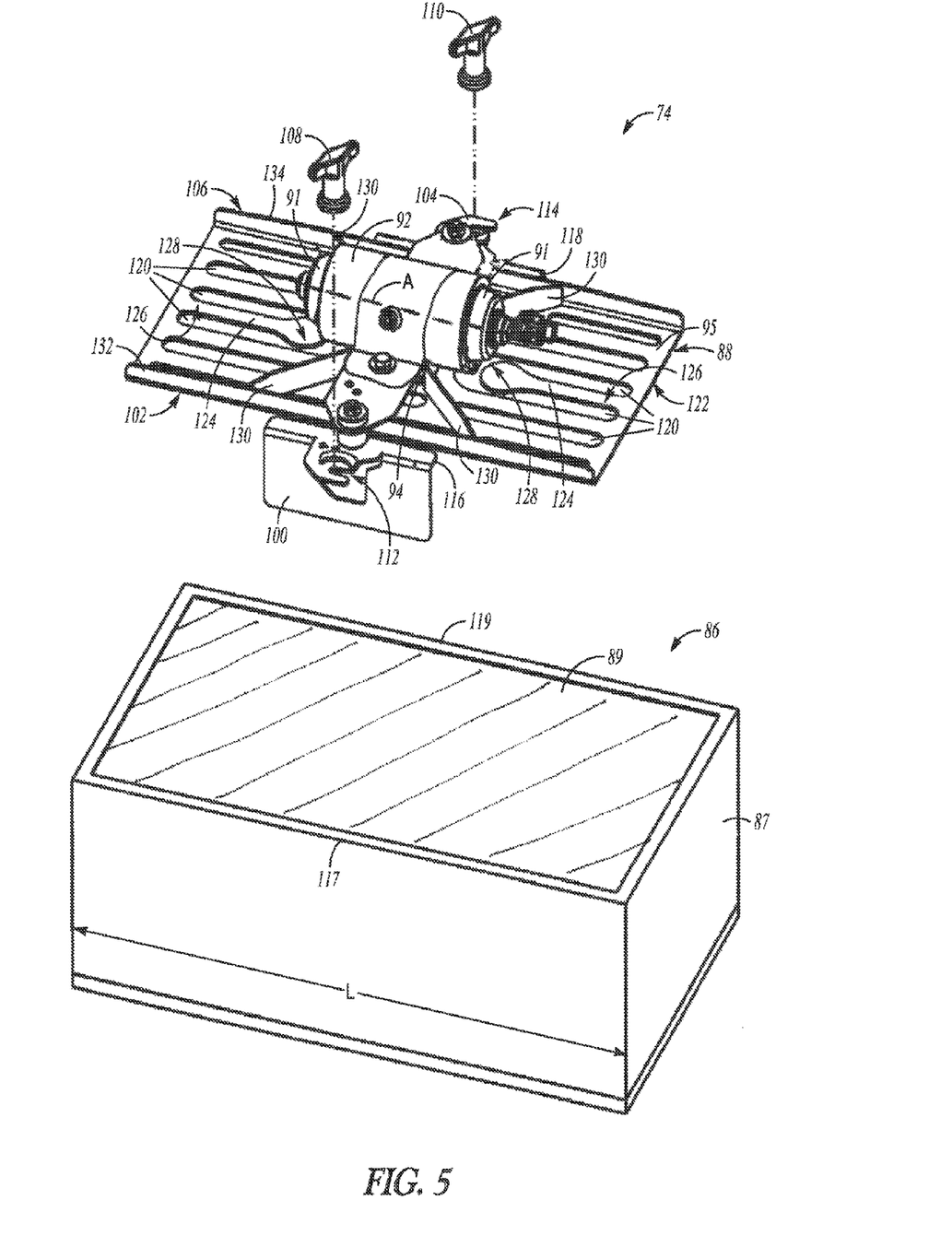
FIG. 5 is a perspective view of the air filter cleaning system detached from the air filter.

FIG. 4 is an enlarged perspective view of the air filter cleaning system 74 positioned within the air fitter compartment 76 and coupled to an air fitter 86. The air filter 86 can include an air filter frame 87 and air filter media 89 disposed therein. As illustrated in FIG. 4, the air filter cleaning system 74 can include a filter shaker plate 88 and a filter shaker motor 92. With reference to FIGS. 4 and 5, the filter shaker motor 92 can include a motor shaft having one or more eccentric weights 91 coupled thereto. When a single eccentric weight 91 is mounted on one end of the filter shaker motor 92, or when two substantially equal eccentric weights 91 are mounted on opposing ends of the filter shaker motor 92 and not aligned on the same side of the motor shaft, they can impart a rocking motion upon the filter shaker motor 92. When two eccentric weights 91 are positioned on opposing sides of the filter shaker motor 92 and aligned on the same side of the motor shaft, they can impart a generally cylindrical movement of the filter shaker motor 92. As the motor shaft rotates, the one or more eccentric weights 91 can cause the filter shaker motor 92 to vibrate. Any suitable filter shaker motor 92 can be utilized, such as an electric motor or a hydraulic motor.

The air filter cleaning system 74 can include a motor mount 94 extending from a top surface 95 of the filter shaker plate 88 that is configured to hold the filter shaker motor 92. The motor mount 94 can include first and second flanges 96 and 98 extending therefrom that can be generally perpendicular to the motor shaft and generally aligned with a center of gravity of the filter shaker motor 92. The air filter cleaning system 74 can also include a first filter clamp 100 configured to be positioned adjacent to a first side 102 of the filter shaker plate 88 and a second filter clamp 104 configured to be positioned adjacent to a second side 106 of the filter shaker plate 88. The first and second flanges 96 and 98 can be coupled to the first and second filter clamps 100 and 104 with suitable fastening members to position the filter shaker plate 88 above the air filter 86. The filter shaker plate 88, the motor mount 94, the first and second flanges 96 and 98, and the first and second filter clamps 100 and 104 can be formed from any suitable material, such as various metals, plastics, or the like.

In an example, the air filter cleaning system 74 can include first and second clamp securing members 108 and 110 configured to secure the first and second filter clamps 100 and 104 to posts 111 within the air filter compartment 76. As illustrated in FIG. 4, the first and second clamp securing members 108 and 110 can be T-handles having an internally threaded connection that is configured to engage an externally threaded post 111. However, any suitable connection means can be used in place of a threaded connection.

In order to minimize the risk of the filter shaker plate 88 becoming dislodged as a result of vibration during operation of the filter shaker motor 92, the first and second filter clamps 100 and 104 can include corresponding first and second stop members 114 and 116 that mate with the first and second clamp securing members 108 and 110. In an example, the first and second stop members 114 and 116 can include a curved inner surface that mates with a curved outer surface of the first and second clamp securing members 108 and 110.

FIG. 5 is a perspective view of the air filter cleaning system 74 detached from the air filter 86. The first and second filter clamps 100 and 104 can include first and second openings 112 and 114, respectively, that are configured to receive the posts 111 within the air filter compartment 76. The openings 112 and 114 can be opened ended, as illustrated in FIG. 5, or closed ended. When closed ended openings 112 and 114 are utilized, the openings can include an inner dimension that is larger than an outer dimension of the posts 111 such that the openings 112 and 114 can slide over the posts 111.

As illustrated in FIG. 5, the first filter clamp 100 can include a first inwardly projecting flange 116 configured to mate with a first side 117 of the air filter frame 87, and the second filter clamp 104 can include a second inwardly projecting flange 118 configured to mate with a second side 119 of the air filter frame 87. The first and second inwardly projecting flanges 116 and 118 can allow the air filter cleaning system 74 to be coupled to the air filter frame 87 white avoiding any substantial contact with the filter media 89 prior to operation of the filter shaker motor 92.

The filter shaker plate 88 can include a plurality of elongated slots 120 extending between the top surface 95 and a bottom surface 122 of the plate. The slots 120 can be configured to allow the free passage of air from the air fitter 86 through the filter shaker plate 88. In addition to allowing for air flow, the slots 120 can be configured to decrease the rigidity of the filter shaker plate 88 such that the filter shaker plate 88 can vibrate more freely across the entire surface of the filter media 89. As illustrated in FIG. 5, the filter shaker plate 88 can include one or more paddle members 124 defined between adjacent slots 120. The paddle members 124 can have a first end 126 integral with the filter shaker plate 88 and a second free end 128. The free ends 128 can allow for increased movement and vibration of the paddle members 124 relative to the remaining structure of the filter shaker plate 88 during operation of the filter shaker motor 92.

As discussed above, the fitter shaker motor 92 can be configured to cause vibration of the filter shaker plate 88, which in turn can "shake" the filter media 89 to dislodge dirt and debris that is caught within the filter media 89. Over time, vibration of the filter shaker plate 88 can cause stress and wear, which can lead to failure of the filter shaker plate 88. In an example, one or more support brackets 130 can be provided on the top surface 95 of the filter shaker plate 88 that are configured to increase the rigidity of the plate and minimize the risk of damage or failure. As illustrated in FIG. 5, a plurality of support brackets 130 can be provided that extend between the motor mount 94 and a first plate lip 132 adjacent to the first side 102 of the filter shaker plate 88 or a second plate lip 134 adjacent to the second side 106 of the filter shaker plate 88.

The fitter shaker motor 92 can be positioned in any orientation relative to the filter shaker plate 88 while providing adequate vibration for cleaning the air filter 86. However, in an example, the filter shaker motor 92 can be mounted to the motor mount 94 such that the motor shaft ties along an axis A that is substantially parallel to a longitudinal length L of the air filter 86. Orienting the filter shaker motor 92 with the motor shaft generally parallel to the longitudinal length L of the air filter 86 can allow an increased amount of vibration at the ends of the filter shaker plate 88 farthest away from a center of the air filter 86.

Figure 6:
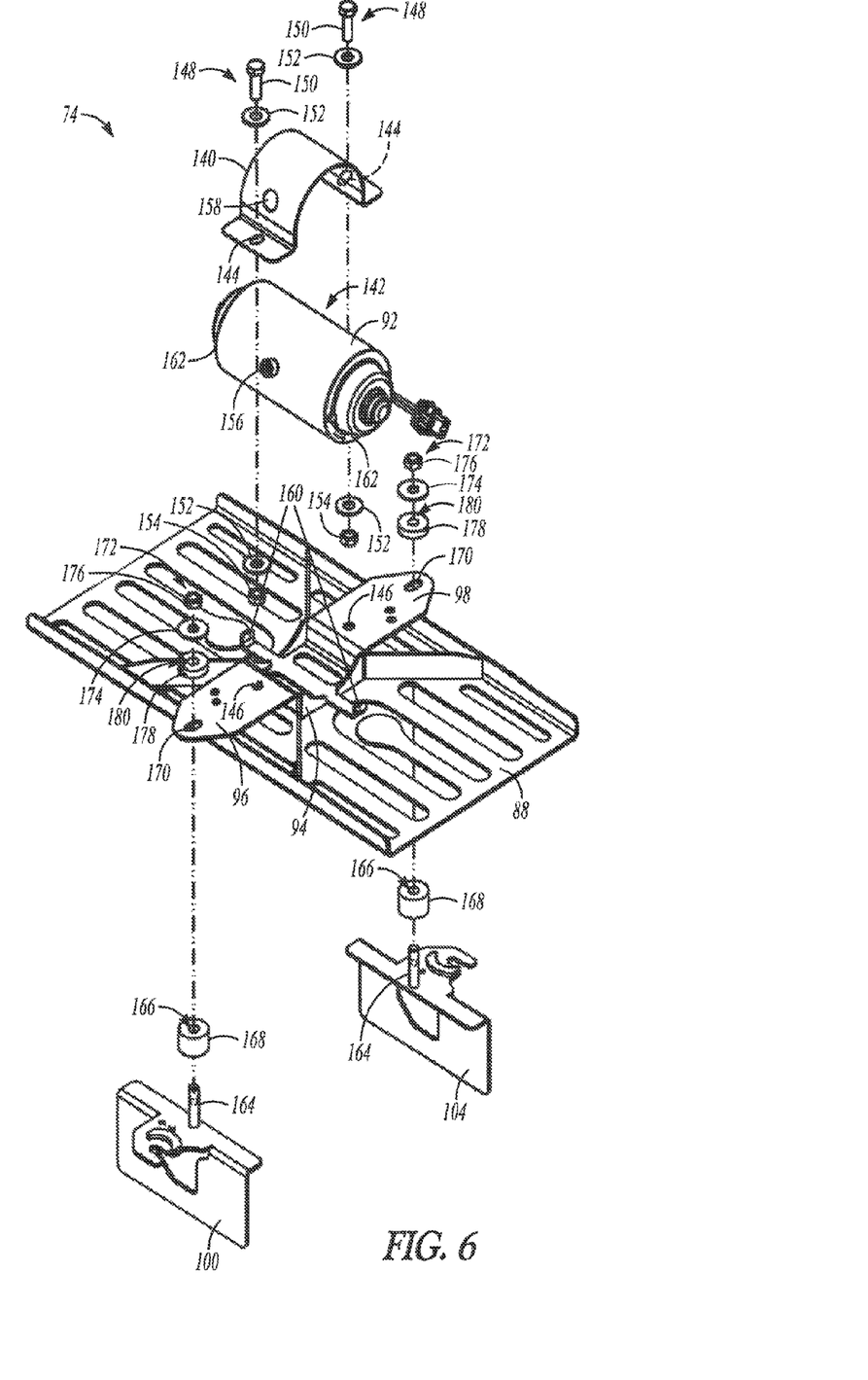
FIG. 6 is an exploded perspective view of the air filter cleaning system of FIGS. 3-5 illustrating the connection of various components.

FIG. 6 is an exploded perspective view of the air filter cleaning system 74 of FIGS. 3-5 illustrating the connection of various components. As illustrated in FIG. 6, the air filter cleaning system 74 can include a motor clamp 140 configured to secure the filter shaker motor 92 to the motor mount 94. The motor clamp 140 can be sized and configured to wrap around and mate with an upper surface 142 of the filter shaker motor 92. The motor clamp 140 can also include a pair of motor clamp fastening apertures 144 configured to align with a corresponding pair of apertures 146 in the first and second flanges 96 and 98. Once the apertures are properly aligned, the motor mount clamp 140 can be coupled to the first and second flanges 96 and 98 with motor clamp fastening means 148. In an example, the motor clamp fastening means 148 can include a threaded bolt 150, one or more washers 152, and a threaded nut 154. However, any suitable fastening means can be used including, but not limited to, snap-fit connections, press-fit connections, welding, or the like.

Although the motor clamp 140 is illustrated and described as a single component, the clamp can alternatively comprise separate clamp components that can be independently coupled to the first and second flanges 96 and 98. The first and second flanges 96 and 98 can also be an integral part of the filter shaker motor 92.

In order to prevent rotation of the filter shaker motor 92 within the motor mount 94, the filter shaker motor 92 can be provided with one or more protrusions 156 that are configured to be received within one or more protrusion receiving apertures 158 formed in the motor clamp 140. Further, the motor mount 94 can include one or more retaining tabs 160 configured to mate with and engage one or more ends 162 of the fitter shaker motor 92 and prevent lateral movement of the filter shaker motor 92 during operation. The one or more protrusions 156 and one or more retaining tabs 160 can also function to center the filter shaker motor 92 on the filter shaker plate 88.

As further illustrated in FIG. 6, the first and second filter clamps 100 and 104 can include studs 164 that are configured to be received within an aperture 166 of an isolator member 168. When assembled, the studs 164 can be received within a corresponding pair of flange apertures 170 in the first and second flanges 96 and 98. The isolator members 168 can be coupled between the first and second flanges 96 and 98 and the first and second filter clamps 100 and 104 with isolator fastening means 172. In an example, the isolator fastening means 172 can include one or more washers 174 and a threaded nut 176. The threaded nut 176 can be configured to engage a threaded portion of the stud 164. However, any suitable fastening means can be used including, but not limited to, snap-fit connections, press-fit connections, welding, or the like.

Alternatively or additionally, isolators 178 can be positioned on an opposing side of the first and second flanges 96 and 98 and engage the studs 164 through apertures 180.

The isolator members 168 and/or 178 can be configured to allow the filter shaker plate 88 to pivot about an axis that extends between the two studs 164. The isolator members 168 and/or 178 can also allow the filter shaker plate 88 to move vertically along a longitudinal axis of the studs 164. As previously discussed, movement of the shaker plate 88 can cause vibration of the filter media 89, which in turn can allow removal of dirt and debris from the filter media 89. In addition to the isolator members 168 and/or 178, the first and second flanges 96 and 98 can also provide some flexibility to the filter shaker plate 88 and allow for vertical movement of the filter shaker plate 88.

At rest, the bottom surface 122 of the filter shaker plate 88 can be positioned in close proximity to but spaced apart from the filter media 89. The spacing can allow the filter shaker plate 88 to move farther when it starts vibrating, thus increasing the amplitude of the impact on the upper surface of the filter media 89. However, the filter shaker plate 88 can also be positioned such that, at rest, the bottom surface 122 of the filter shaker plate 88 is in contact with the filter media 89. The vertical position of the filter shaker plate 88 above the filter media 89 can be adjusted by compression of the isolator members 168 and/or 178 via the threaded nuts 176. Particularly, the threaded nuts 176 can be tightened and loosened to adjust the vertical position of the filter shaker plate 88 above the filter media 89 (i.e. the more the threaded nuts 176 are tightened the closer the filter shaker plate 88 can be positioned with respect to the fitter media 89). Thus, the isolator members 168 and/or 178 not only allow for vibratory movement of the filter shaker plate 88, but they also allow for vertical adjustment of the filter shaker plate 88 relative to atop surface of the air filter 86.

The isolator members 168 and/or 178 can be formed from any suitable material that allows for at least minimal compression. Examples of suitable materials include elastomers or rubbers such as polyisoprene, polybutadiene, polyisobutylene, polyurethane, or the like.

A benefit of the air filter cleaning system 74 of the present patent application is that the air filter 86 can be secured in place completely independent of the fitter shaker plate 88. Stated alternatively, the fitter shaker plate 88 does not need to be installed in order to secure the air filter 86 in place within the air filter compartment 76. Particularly, the first and second filter clamps 100 and 104 can be secured to the posts 111 to retain the air filter 86 in place prior to attachment of the filter shaker plate 88. With the air filter 86 secured in place, the first and second flanges 96 and 98 extending from the motor mount 94 can then be secured to the studs 164 of the first and second filter clamps 100 and 104 as previously described. Alternatively, the filter shaker plate 88 can be pre-assembled to the first and second filter clamps 100 and 104.

Figure 7A:
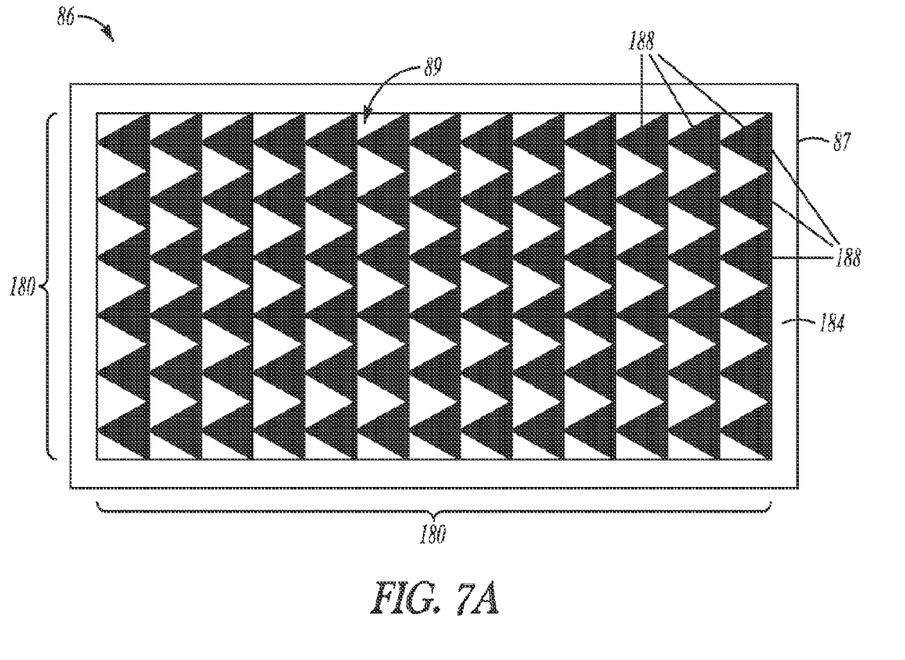
FIGS. 7A and 7B are bottom and top views, respectively, of the air filter.
Figure 7B:
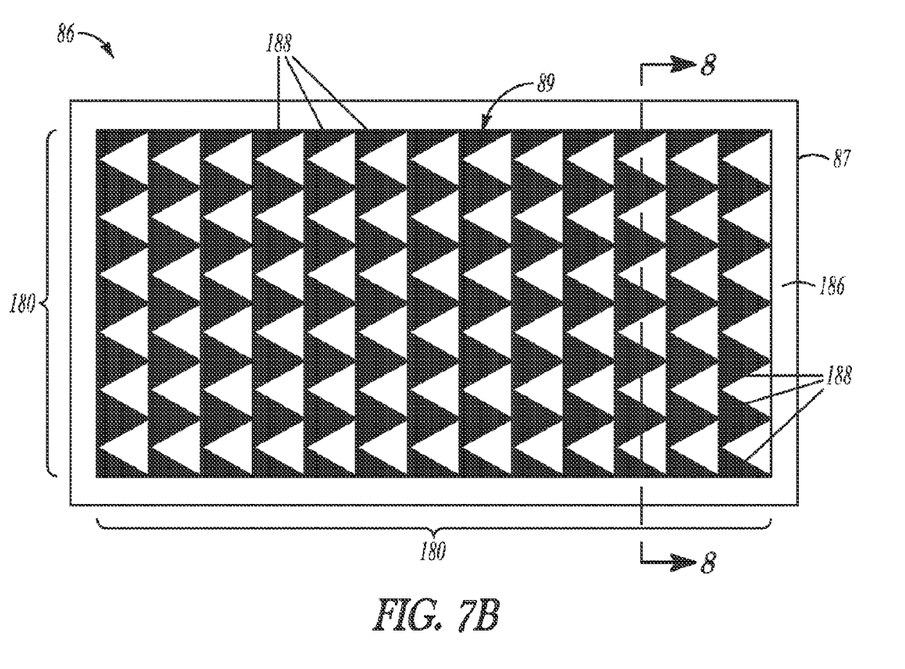

FIGS. 7A and 7B illustrate bottom and top views, respectively, of the air filter 86. In an example, the filter media 89 can include a plurality of vertical flutes 180 extending between a bottom surface 184 of the air filter 86 and a top surface 186 of the air filter 86. As illustrated in FIG. 7A, alternating flutes 180 can include an obstruction 188 positioned in the corresponding inlets to block air from flowing into those particular flutes 180. With reference to FIG. 7B, the flutes 180 having the obstructions 188 in the inlets can have an open flute outlet to allow air to pass therethrough. Conversely, the flutes 180 that have an open inlet in FIG. 7A can include obstructions 188 positioned in the corresponding outlets, as illustrated in FIG. 7B. Thus, each of the flutes 180 can include either an obstructed inlet or an obstructed outlet. Any suitable material can be used to form the obstructions 188, including a plastic material, a glue joint, or the like.

Figure 8:
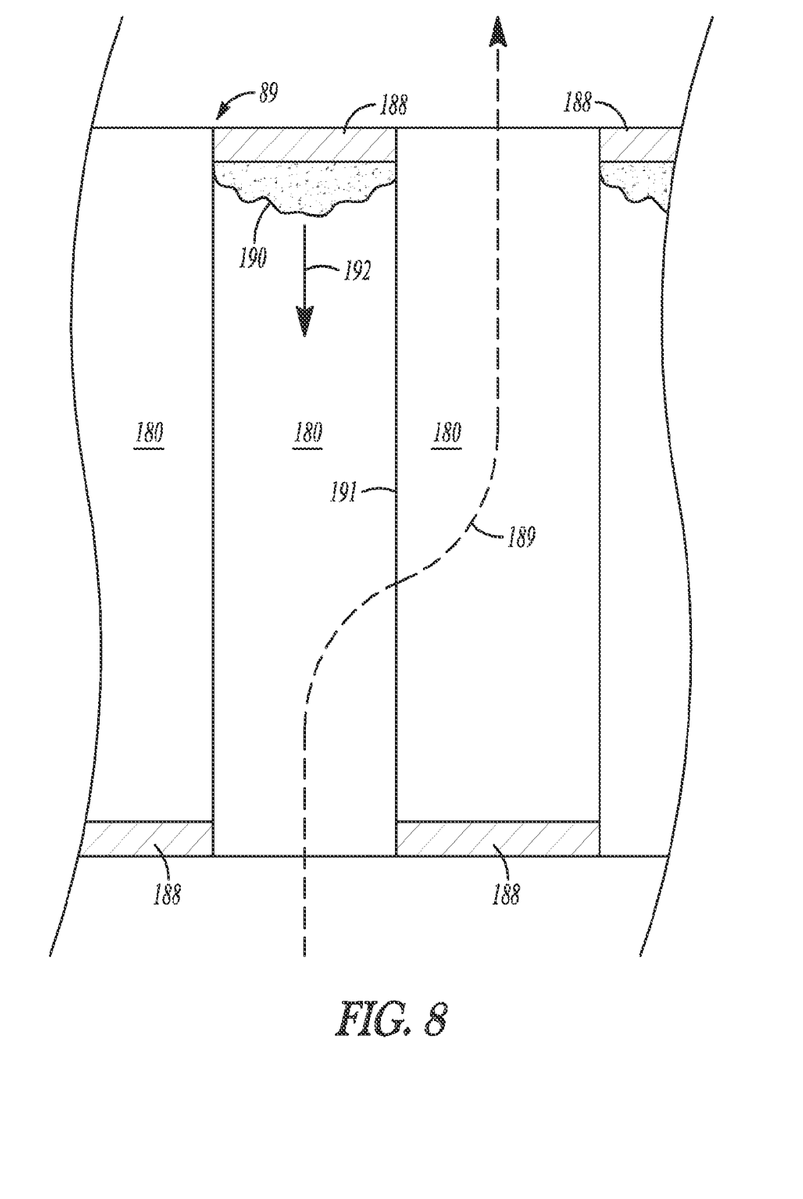
FIG. 8 is partial cross-sectional view of the air filter illustrating air flow through the filter.

FIG. 8 is partial cross-sectional view of the air filter 86 taken along line 8-8 in FIG. 7B depicting air flow through the filter media 89. As illustrated in FIG. 8, air flow 189 can enter an open flute inlet of one of the flutes 180 and be suctioned through an inner wall 191 of the filter media 89 and into an adjacent flute 180 having an open flute outlet. Thus, by providing obstructions 188 in adjacent flutes 180, the air flow 189 can be forced to pass through the inner wall 191 of the filter media 89 prior to being expelled into the air filter compartment 76. When the vacuum fan 80 is disabled and the filter shaker motor 92 is powered on to initiate direct vibratory contact between the filter shaker plate 88 and the filter media 89, dirt and debris 190 collected in the flutes 180 can be forced to drop in a downward direction, as indicated by arrow 192, and out of the filter media 89. Cyclical vibration, continuous vibration, or a combination of the two can be used during a filter cleaning cycle.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fill within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the frill scope of equivalents to which such claims are entitled.

The claimed invention is:

1. An air filter cleaning system comprising:
    an air filter comprising:
        a filter media frame; and
        a fluted filter media disposed within the filter media frame, the filter media including a plurality of vertical flutes extending from a lower end of the filter media to an upper end of the filter media, each of the flutes including either an obstructed inlet or an obstructed outlet;
    a filter shaker plate having a top surface and a bottom surface, wherein the filter shaker plate is positionable such that the plurality of flutes extend generally perpendicular to the bottom surface of the filter shaker plate, and the bottom surface of the filter shaker plate is spaced interior to the filter media frame and adjacent the upper end of the filter media;
    a motor mount extending from the top surface of the filter shaker plate;
    a motor configured to be mounted on the motor mount;
    a plurality of flanges, including at least:
        a first flange extending outwardly from a first portion of the motor mount and toward a first side of the filter shaker plate, the first flange spaced above the top surface of the filter shaker plate and extending in a plane parallel to the top surface of the filter shaker plate; and
        a second flange extending outwardly from a second portion of the motor mount and toward a second side of the filter shaker plate, the second flange spaced above the top surface of the filter shaker plate and extending in a plane parallel to the top surface of the filter shaker plate; and
    a plurality of filter clamps, including at least:
        a first filter clamp configured to be positioned adjacent to the first side of the filter shaker plate; and
        a second filter clamp configured to be positioned adjacent to the second side of the filter shaker plate.

2. The air filter cleaning system of claim 1, wherein the motor includes one or more eccentrics mounted on a motor shaft.

3. The air filter cleaning system of claim 2, wherein the motor is electric.

4. The air filter cleaning system of claim 3, wherein the motor includes a rotatable shaft extending in a direction substantially parallel to the filter shaker plate.

5. The air filter cleaning system of claim 1, further comprising:
    a first isolator member extending between the first flange and the first filter clamp; and a second isolator member extending between the second flange and the second filter clamp.

6. The air filter cleaning system of claim 5, wherein the first and second isolator members are comprised of an elastomer or rubber.

7. The air filter cleaning system of claim 5, further comprising:
a first stud extending from the first filter clamp and received within the first isolator member; and
a second stud extending from the second filter clamp and received within the second isolator member.

8. The air filter cleaning system of claim 7, wherein the filter shaker plate includes a plurality of slots extending between the top surface and the bottom surface.

9. The air filter cleaning system of claim 8, wherein the first filter clamp includes a first inwardly projecting lip configured to engage a first side of the filter media frame, and wherein the second filter clamp includes a second inwardly projecting lip configured to engage a second side of the filter media frame.

10. The air filter cleaning system of claim 1, wherein the bottom surface of the filter shaker plate is in direct physical contact with the upper end of the filter media.

11. The air filter cleaning system of claim 8, further comprising first and second fastening members coupled to the first and second studs, respectively, and configured for adjusting an amount of compression of the first and second isolator members.

12. The air filter cleaning system of claim 11, further comprising a motor clamp configured to wrap around a top surface of the motor and secure the motor to the motor mount.

13. The air filter cleaning system of claim 8, wherein the filter shaker plate includes at least one paddle member defined between two adjacent slots, the at least one paddle member having a first end that is integral with the filter shaker plate and a second free end.

14. The air filter cleaning system of claim 13, wherein the filter shaker plate includes first and second paddle members.

15. The air filter cleaning system of claim 14, wherein the first and second paddle members are located at first and second opposing sides of the motor mount.

16. An air filter cleaning system comprising:
an air filter comprising:
a filter media frame; and
a fluted filter media disposed within the filter media frame, the filter media including a plurality of vertical flutes extending from a lower end of the filter media to an upper end of the filter media, each of the flutes including either an obstructed inlet or an obstructed outlet;
a filter shaker plate having a top surface and a bottom surface, the filter shaker plate including a plurality of slots extending between the top surface and the bottom surface;
a motor mount extending from the top surface of the filter shaker plate;
a motor configured to be mounted on the motor mount, the motor having at least one eccentric configured to impart vibration to the filter shaker plate;
a plurality of flanges, including at least:
a first flange extending outwardly from a first portion of the motor mount and toward a first side of the filter shaker plate, the first flange spaced above the top surface of the filter shaker plate and extending in a plane parallel to the top surface of the filter shaker plate; and
a second flange extending outwardly from a second portion of the motor mount and toward a second side of the filter shaker plate, the second flange spaced above the top surface of the filter shaker plate and extending in a plane parallel to the top surface of the filter shaker plate; and
a plurality of filter clamps, including at least:
a first filter clamp configured to be positioned adjacent to the first side of the filter shaker plate; and
a second filter clamp configured to be positioned adjacent to the second side of the filter shaker plate;
wherein when the air filter cleaning system is in an assembled state, the filter shaker plate is positioned such that the plurality of flutes extend generally perpendicular to the bottom surface of the filter shaker plate, and the bottom surface of the filter shaker plate is in direct physical contact with the upper end of the filter media.

17. The air filter cleaning system of claim 16, further comprising:
a first isolator member extending between the first flange and the first filter clamp; and
a second isolator member extending between the second flange and the second filter clamp.

18. The air filter cleaning system of claim 17, wherein the first and second isolator members are comprised of an elastomer or rubber.

* * * * *